HIGH SPEED CARRY APPARATUS FOR A PARALLEL ACCUMULATOR

Filed April 25, 1958 3 Sheets-Sheet 1

Inventor
N. D. Robinson
By Glascock Downing & Seebold,
Attys

Feb. 11, 1964 N. D. ROBINSON 3,121,161

HIGH SPEED CARRY APPARATUS FOR A PARALLEL ACCUMULATOR

Filed April 25, 1958 3 Sheets-Sheet 2

Inventor
N. D. Robinson
By Glascock Downing & Seebold
Attys.

Feb. 11, 1964 N. D. ROBINSON 3,121,161

HIGH SPEED CARRY APPARATUS FOR A PARALLEL ACCUMULATOR

Filed April 25, 1958 3 Sheets-Sheet 3

Inventor
N. D. Robinson
By Mascock Downing Seebold
Attys

United States Patent Office 3,121,161

Patented Feb. 11, 1964

3,121,161
HIGH SPEED CARRY APPARATUS FOR A PARALLEL ACCUMULATOR

Nigel David Robinson, Hillingdon, England, assignor to Electric & Musical Industries Limited, Hayes, Middlesex, England, a company of Great Britain Filed Apr. 25, 1958, Ser. No. 730,980
Claims priority, application Great Britain Apr. 30, 1957
4 Claims. (Cl. 235—175)

This invention relates to digital adding circuits, especially in the form of parallel binary accumulators.

A major problem in the design of any parallel binary accumulator is that of the rapid propagation of carries through successive stages containing 1's.

The object of the present invention is to facilitate the propagation of carries without cumultaive delay.

According to the present invention there is provided a digital adding circuit suitable for use as one stage of a parallel accumulator, comprising a device the state of which is responsive to applied signals to represent one digit of the sum of corresponding individual digits represented by the applied signals, a first path for receiving a signal representing a carry from the preceding circuit, a second path for receiving a signal representing no carry from a preceding circuit, and means for selectively steering a signal from one path to the other in dependence upon the state or states of said device before and after an applied signal, and in such a way as to represent a carry or no carry to a succeeding circuit.

In order that the present invention may be clearly understood and readily carried into effect, the invention will be described with reference to the accompanying drawings, in which.

Figures 3, 4:
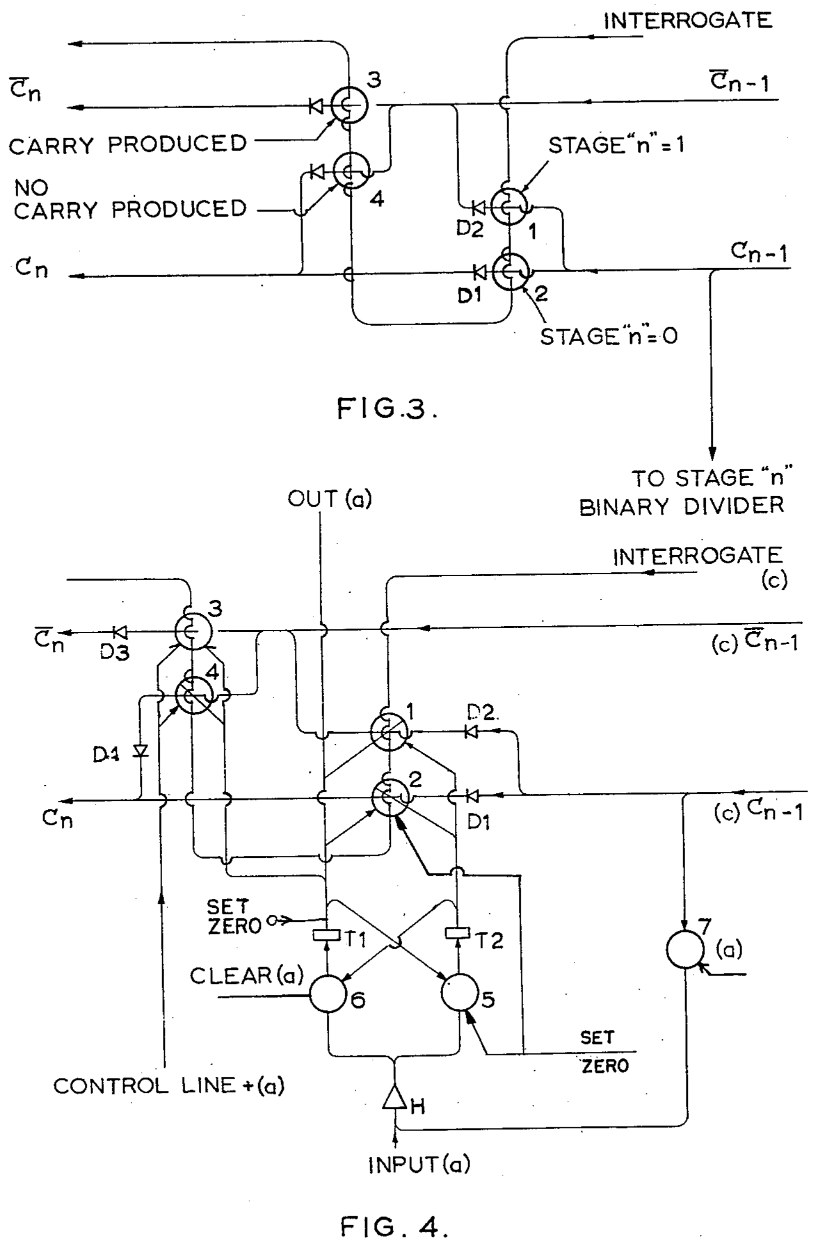
Figure 5:
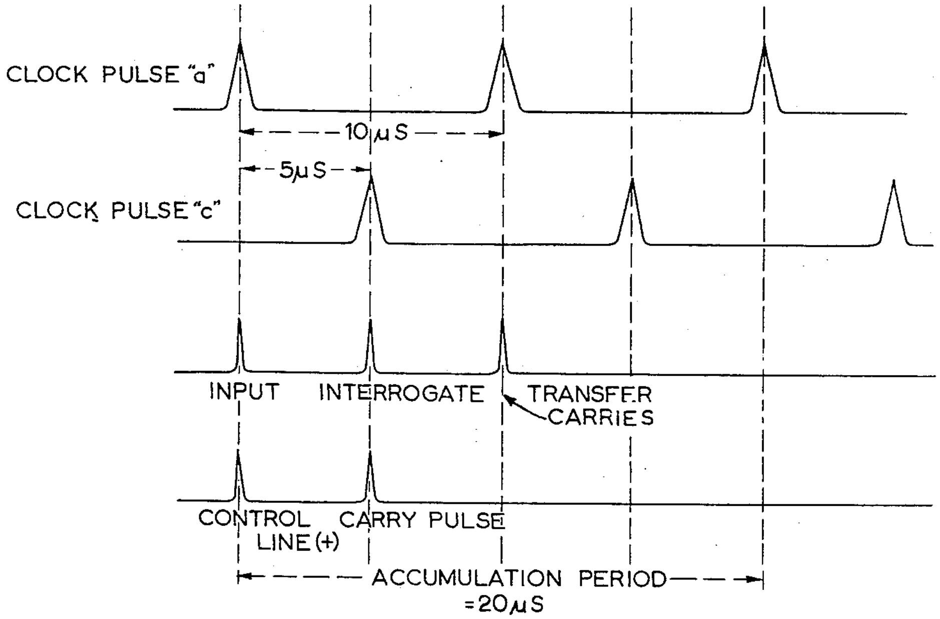
Figure 6:
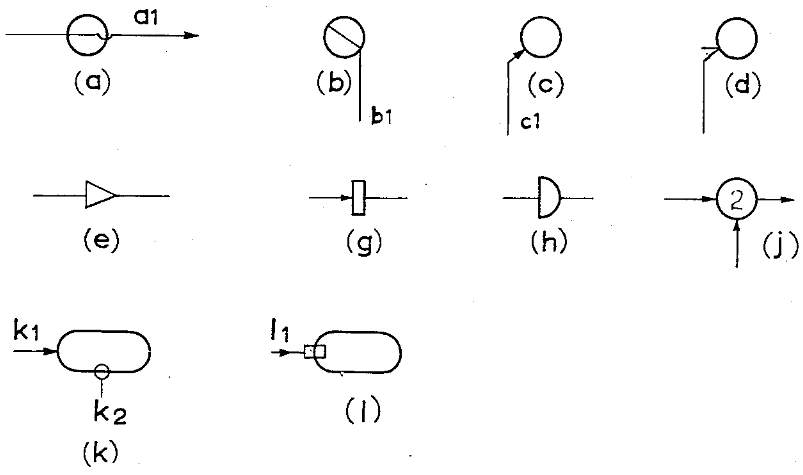

FIGURES 3 and 4 together illustrate one stage of a parallel binary accumulator according to the present invention, FIGURE 5 is a time-chart of the operation of FIGURES 3 and 4, and FIGURE 6 illustrates individually some symbols which are used in other figures of the drawings, to represent conventional elements, with the object of simplifying the drawings and facilitating description thereof.

Referring firstly to FIGURE 6, (*a*) denotes a magnetisable core having a conductor *a*1 laced through it. Such a core is used as a storage element for binary bits, one state of remanence magnetism being used to represent "1" and the opposite state of remanence magnetism being used to represent "0." Current pulses in a conductor laced through the core are assumed to be of sufficient amplitude to switch the core from one state to the other, depending upon the polarity of the current.

Symbol (*b*) represents a magnetic core having on it a winding *b*1 which when energised inhibits any change of the core from the "0" state.

Symbol (*c*) represents a magnetic core having on it a winding *c*1 which when energised is capable of switching the core to the "1" state from the "0" state. Symbol (*d*) denotes a magnetic core having on it a winding which has half the number turns, or receives a current of half the amplitude required for switching the core to the "1" state from the "0" state.

Symbol (*e*) denotes an amplifier in general and symbol (*g*) denotes an amplifier which is specifically a transistor amplifier.

Symbol (*h*) denotes a delay element.

Symbol (*j*) denotes a gate of which the threshold is indicated by the enclosed numeral.

Symbol (*k*) denotes a trigger circuit which is switched to one state when a pulse is applied by the lead *k*1 and to the reverse state when a pulse is applied by the lead K2. Symbol (*l*) denotes a trigger circuit which alternates between two stable states on receipt of successive pulses on the input lead $l_1$. The circuits denoted by (*k*) and (*l*) may also be referred to as two state devices.

Figure 1:
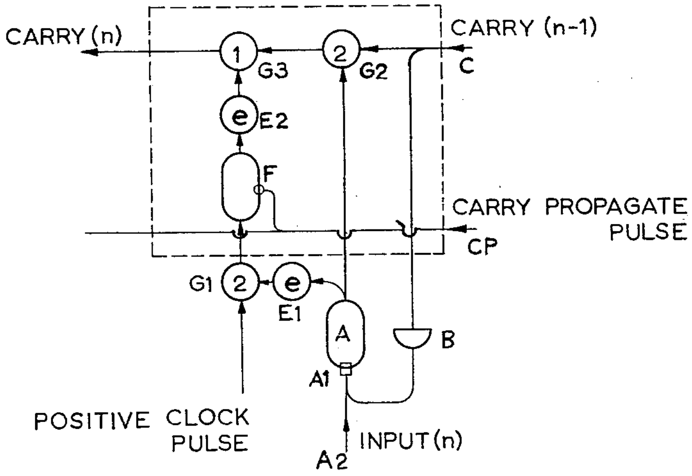
FIGURE 1 illustrates a known arrangement, for comparison purposes.

FIGURE 1 of the drawings shows, for comparison purposes, a single stage of a parallel binary accumulator using a known technique for carry propagation. It comprises a trigger circuit A which is switched alternately to its two stable states by input pulses applied on the line A1. Such pulses may represent digits of unit value, of the appropriate binary order, applied via the line A2 or may represent carries received via a delay element B from a carry line C. Input signals on the line A2 are synchronised with pulses which are applied to a gate G1 of threshold 2, the condition of pulse or no pulse on the line A2 being considered in known manner to represent 1 or 0. A carry signal, which may also comprise a pulse or no pulse, appears on the line C between the clock pulses applied to the gate G1. The components shown within the dotted outline of FIGURE 1 are those which determine whether a carry is propagated from the stage shown to the next stage. These components comprise a gate G2 of threshold 2 which transmits pulses when the trigger circuit A is in the state representing "1" when a carry pulse occurs on line C. A pulse from the gate G2 corresponds to a carry from the stage shown, being transmitted to the output via the gate G3 of threshold 1. The incoming carry pulse applied to the circuit A via the delay elements B subsequently restores the circuit A to state 0 to register the correct total taking account of the incoming carry. A carry is also transmitted to the next stage of the accumulator if the trigger circuit F is in state 1 when a carry propagating pulse occurs on the line CP such pulses being synchronised with the carry signals. The trigger circuit F is found in state 1 at such a time only if the preceding input signal on the line A2 has changed the trigger circuit A from state 1 to state 0, an event which of course demands that a carry be sent to the next stage. The change of A from state 1 to state 0 causes the end element E2 to set up a pulse, which being coincident with the clock pulses causes the gate G1 to produce an output pulse setting the circuit F in state 1 as required. The carry propagating pulse when it occurs switches the circuit F back to state 0 causing the end element E2 to produce an output pulse which is transmitted by the gate G2 as a carry signal to the output of the stage. It can be seen that the carry chain of the arrangement shown in FIGURE 1 when applied to the multiple parallel accumulator consists of a long sequence of 1 and 2 gates and such a chain would introduce a considerable time delay if conventional techniques are used.

Figure 2:
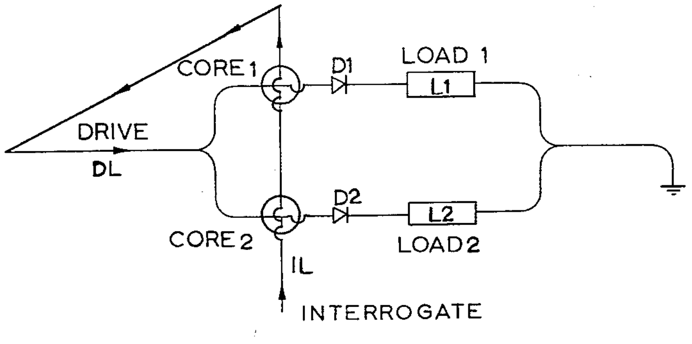
FIGURE 2 illustrates the principle of current steering.

In the examples of the invention to be described, current steering is used to reduce these delays and to explain the principle of current steering with reference to FIGURE 2, suppose a pulse of drive current is applied to the drive lead DL. Then if the state of each core 1 and 2 remains unchanged the current will divide itself between the two loads L1 and L2. Suppose now that one of the cores had been previously set and a pulse of current along the "Interrogate" line IL is caused to reset this core at the same time as the drive pulse is applied, the resetting of the cores will produce an E.M.F. which will forward bias the polarised device in the form of a diode D1 or D2 in the corresponding branch and cause the drive current to pass preferentially down that branch. If the numbers of turns and the pulse currents are correctly chosen it is possible to achieve 100% steering in this way. This principle can be applied to circuits with any number of parallel branches. If both "Drive" and "Interrogate" pulses are sufficiently short in duration a single pulse generator may be used by wiring the "Drive" and the "Interrogate" lines DL and IL in series (shown by the dotted line in FIGURE 2), in this way absolute coincidence of the pulses can be ensured. It is also possible, in the two-branch case, to wire the cores in the opposite sense so that the resetting of one core back-biases the diode, with the result that the current is steered down the other branch. This method of "complementary" steering has the advantage that fewer turns of wire are required on the cores; the steering circuits used in the Binary Accumulator are assumed to be of the "complementary" type.

Since the route the drive current is to take can be determined at any previous time by setting the appropriate cores, circuits involving current steering are closely analogous to relay circuits where the relays are fitted with "Self-hold" contacts.

FIGURE 3 illustrates how the invention may be applied in place of the portion of FIGURE 1 inside the dotted rectangle. The carry propagating pulse of FIGURE 1 is applied to the accumulator in the form of a pulse of current which passes along the carry chain through each stage together with an interrogating pulse. The current may arrive at or depart from each stage by one of two paths, signifying in each case the presence or absence of a carry. If stage "$n-1$" generates a carry, current arrives at stage "$n$," which is that shown, via the line $c_{n-1}$. The steering cores 1 and 2 with associated rectifiers D1 and D2 direct that current out via $c_n$ if the stage contains a "1" and by way of the switch-across path, which is laced through the core 1, into the $c_{n-1}$ line if the stage contains a "0." If stage "$n-1$" generates no carry, current arrives at stage "$n$" via $\bar{c}_{n-1}$. The steering cores 3 and 4 with associated rectifiers D3 and D4 direct the current into the $c_n$ line if the content of stage $n$ has just turned from "1" to "0" and into the $\bar{c}_n$ line otherwise. In this way carries are propagated without any cumulative delay and the time for clearance of carries should not be in excess of 3$\mu$'s, i.e. approximately the turn over time of a core.

FIGURE 4 shows a complete accumulator stage using this technique. Input signals representing binary digits are applied via the amplifier H to the bistable device formed by the magnetic cores 5 and 6 which are cross-coupled by means of the transistor amplifiers T1 and T2. In the operation of the bistable device, one of the magnetic cores 5 and 6 is set in the "1" state and the other to the "0" state, the states of the magnetic cores being interchanged with each pulse applied via the amplifier H. The action of the pulses from the amplifier H is to drive the cores 5 and 6 to the "0" state, whereupon only the core which was in the "1" state will change state and cause a pulse to be applied to the respective transistor T. The transistors T1 and T2 are arranged to stretch the pulses applied to them by means of hole storage, so that after the termination of the pulse from the amplifier H, the current from the conducting transistor is able to set the core which it drives to the "1" state. In this way, the state of the bistable device, as represented by the state of the cores 5 and 6, is changed with each pulse from the amplifier H. Since, for the operation of the carry arrangement, it is desired that the cores 1 and 2 follow the states of the cores 6 and 5 respectively, the output signals from the transistors T1 and T2 are coupled to the cores 1 and 2 in such a manner that with every exchange of state of the cores 6 and 5, the cores 1 and 2 exchange state. Therefore, when the stage contains a "1" the cores 6 and 1 are set to the "1" state, and 5 and 2 to the "0" state; and when the stage contains a "0" the cores 5 and 2 are set to the "1" state and the cores 6 and 1 are set to the "0" state.

At the start of an accumulation the stage is set to the "0" state with the cores 5 and 2 set to the "1" state by means of a pulse on the "set zero" line, and the augend digit is applied as a pulse via the amplifier H, so that if the augend digit is "0" then no pulse is applied and if it is a "1" then a single pulse is applied which causes the cores 5 and 6 and 1 and 2 to exchange states. Then the addend digit is applied to the amplifier H and has the same effect as the augend digit on the bistable device. Simultaneously with the application of the addend digit to the amplifier H, a pulse is applied to the control line so that if the bistable device changes state from a "1" to a "0" with the application of the addend digit then the core 3 is set to the "1" state by the coincidence of half strength flux pulses from the control line and from the transistor T1; but if the bistable device does not change from a "1" to a "0" with the addend digit then the core 4 is set to the "1" state in response to the current from the control line, there being no inhibiting effect from T1. Therefore it may be seen that the cores 1, 2, 3 and 4 are set up in the manner required for the operation of the carry arrangement described with reference to FIGURE 3. After the arrival of the addend digit the interrogator line and the carry chain are energised and any carry arising from a previous stage is stored on core 7. Finally the next drive pulse "$a$" clears core 7 and passes the carry digit into the flip-flop which will now contain the correct answer digit. The operation of the carry arrangement may best be understood by regarding the cores 1, 2, 3, and 4 as inhibit gates which prevent the carry signal current from passing through them if they were in the "1" state when the interrogating signal was applied to them. At the end of the accumulation the result is transferred to another register via the "Out" line in response to a pulse on the "Clear" line.

A time chart of the operation is shown in FIGURE 5 based on a clock rate of 100 kc./s., the small bracketted letters in FIGURE 4 denoting pulse timings relative to the two sets of clock pulses ($a$) and ($c$) indicated in FIGURE 5.

As a similar problem of carry propagation may occur in a parallel subtracting circuit, it is to be understood that the invention may be applied also to such circuits, and the term "adding" in the following claims is used in a generic sense and is intended to include subtraction on the basis that subtraction is a form of addition.

What I claim is:

1. A digital adding circuit suitable for use as one stage of a parallel accumulator comprising a multi-state device, which is responsive to applied signals so that the state of said device represents one digit of the sum of corresponding individual digits represented by applied signals, a first path for receiving a signal representing a carry input to the circuit, a second path for receiving a signal representing no carry input to the circuit, a third path for transmitting a signal representing a carry output from the circuit, a fourth path for transmitting a signal representing no carry output from the circuit, first steering means responsive to the state assumed by said device in response to an applied signal said first steering means comprising first and second gates, said first gate being connected from said first path to said third path and said second gate being connected from said first path to said second path, said first and second gates being conditioned to steer a signal on said first path to said third path if said device is in one state and being conditioned to steer a signal on said first path to said second path when said device is a different state, means for producing a change-of-state signal when said device changes from said one state to a different state in response to an applied signal and second steering means responsive to said change-of-state signal, said second steering means comprising third and fourth gates, said third gate being connected from said second path to said third path and said fourth gate being connected from said second path to said fourth path, said third and fourth gates being conditioned to steer a signal on said second path to said third path when said change of state signal occurs and being conditioned to steer a signal on said second path to said fourth path when said change of state signal does not occur.

2. A circuit according to claim 1 adapted for applied signals representing binary digits, said device comprising a two state device changeable from either of its two states to the other in response to an applied signal representing unity.

3. A digital adding circuit suitable for use as one stage of a parallel accumulator comprising a multi-state device, which is responsive to applied signals so that the state of said device represents one digit of the sum of corresponding individual digits represented by applied signals a first path for receiving a signal representing a carry input to the circuit, a second path for receiving a signal representing no carry input to the circuit, a third path for transmitting a signal representing a carry output from the circuit, a fourth path for transmitting a signal representing no carry output from the circuit, two magnetisable cores one coupled with first transfer path from said first to said third path and the other coupled with second transfer path from said first path to said second path, polarised devices in said transfer paths, means for causing said cores to assume opposite states of remanent selectively independent upon the state of said device assumed in response to said applied signal, means for applying an interrogating signal to said cores tending to switch said cores from a single one of said remanent states to the other in synchronism with a carry or no carry signal in said paths, means for producing a change-of-state signal when said device changes from said one state to a different state in response to an applied signal and second steering means responsive to said change-of-state signal, said second steering means being conditioned to steer a signal on said second path to said third path when said change of state signal occurs and being conditioned to steer a signal and said second path to said fourth path when said change of state signal does not occur.

4. A digital adding circuit suitable for use as one stage of a parallel accumulator comprising a multi-state device, which is responsive to applied signals so that the state of said device represents one digit of the sum of corresponding individual digits represented by applied signals for receiving a signal representing a carry input to the circuit, a second path for receiving a signal representing no carry input to the circuit, a third path for transmitting a signal representing a carry output from the circuit, a fourth path for transmitting a signal representing no carry output from the circuit, first steering means responsive to the state assumed by said device in response to an applied signal said first steering means being conditioned to steer a signal on said first path to said third path if said device is in one state and being conditioned to steer a signal on said first path to said second path when said device is a different state, means for producing a change-of-state signal when said device changes from said one state to a different state in response to an applied signal, two magnetisable cores one coupled to a third transfer path from said second path and said third path and the other coupled with a fourth transfer path from said second path to said fourth path, polarised devices in said transfer paths means for causing said cores to assume opposite state of remanent magnetism selectively in dependence upon the occurance of a change of state signal and means for applying an interrogating signal to said cores to switch said cores from a single one of said remanent states to the other in synchronism with a carry or no carry signal in said paths.

References Cited in the file of this patent

UNITED STATES PATENTS

| | | |
|---|---|---|
| 2,679,977 | Andrews | June 1, 1954 |
| 2,719,670 | Jacobs et al. | Oct. 4, 1955 |
| 2,734,684 | Ross et al. | Feb. 14, 1956 |
| 2,803,401 | Nelson | Aug. 20, 1957 |
| 2,808,204 | Geger et al. | Oct. 1, 1957 |
| 2,819,839 | Jacobs et al. | Jan. 14, 1958 |
| 2,845,222 | Genna et al. | July 29, 1958 |
| 2,868,455 | Bruce et al. | Jan. 13, 1959 |